Oct. 10, 1961 S. SWADESH 3,003,353
METHOD AND APPARATUS FOR TESTING OIL
FOR MOISTURE CONTENT
Filed Sept. 29, 1958
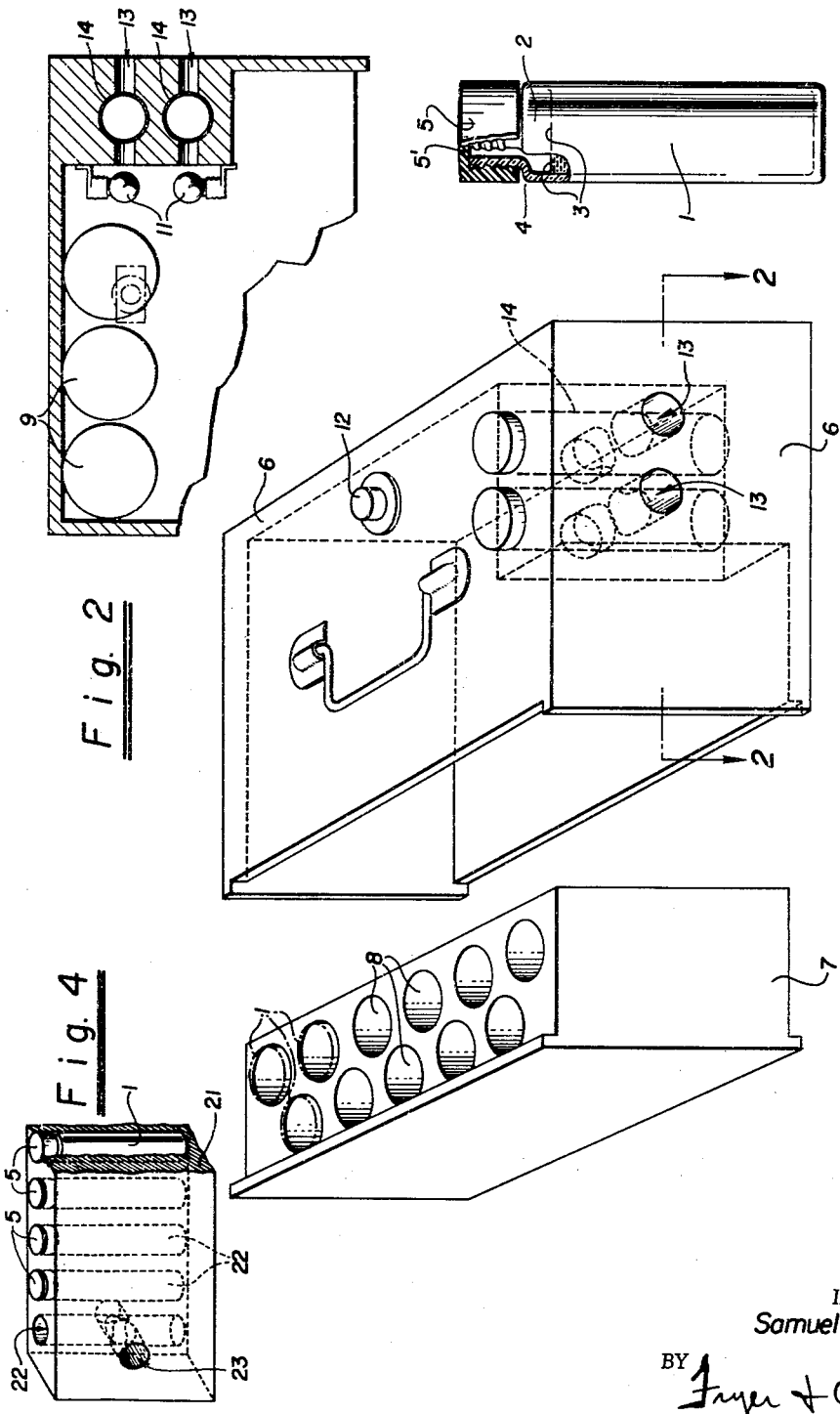
INVENTOR.
Samuel Swadesh
BY
Fryer + Johnson
Attorneys 3,003,353
METHOD AND APPARATUS FOR TESTING OIL FOR MOISTURE CONTENT
Samuel Swadesh, Mill Valley, Calif., assignor to Yosemite Chemical Co., San Francisco, Calif., a corporation of California
Filed Sept. 29, 1958, Ser. No. 764,184
5 Claims. (Cl. 73—73)

This invention relates to testing of oil for determining moisture content, and more particularly to the testing of lubricating oil in an internal combustion engine for determining whether such oil contains water in an amount that would be damaging to further operation of the engine.

Water in the lubricating oil of an internal combustion engine can be very damaging to relatively movable metal working parts of the engine, such as crank shafts and many bearings. For instance, in diesel engines, such as used on railroad locomotives, it is generally recognized that if the water content of the lubricating oil can be kept below about 0.45% to 0.5% by weight, damage from water can be prevented. At about 0.6% by weight water and over, continual operation of the engine will in most instances result in damage thereto. When the water content reaches about 1% by weight and higher, experienced mechanics can recognize this condition by the appearance of the oil because the water becomes emulsified in the oil and the oil will show a characteristic murky appearance peculiar to an emulsion.

However, by this time, sufficient damage may have occurred, depending how long the engine has been operating with a damaging amount of water in the oil, to necessitate repairs costing many thousands of dollars. In order to learn whether the water content has reached the precautionary safe limit of about 0.45% to 0.5% or the maximum safe limit of about 0.6%, it has been the usual practice heretofore to resort to laboratory tests, such as the A.S.T.M. D95–46 method which requires distillation apparatus, or the A.S.T.M. D96–52T method which requires centrifuging and which does not adequately distinguish between water and sediment. These types of tests and others which have heretofore been employed necessitate testing in the railroad terminal yards where laboratory facilities are available, but then when an engine has terminated its run, and the test shows excessive amount of water in the lubricating oil, it may have been too late to have avoided the damage that may have occurred during the operating run of the engine.

The railroads have particularly sought a field method which could be carried out while the locomotive is en route, and which is simple, inexpensive and rapid, and which does not require the skill and equipment of a chemist in a laboratory. Such frequent or periodic field testing of the water content of the oil at various stop stations en route, or while the locomotive is traveling would enable detecting of dangerous conditions before expensive damage can occur. A method heretofore employed in an attempt to accomplish this purpose is the so-called "frying pan" test in which a small amount of oil is placed in a miniature frying pan, which is then heated by a kitchen match. If the oil spatters during the frying the presence of water is shown.

This test is far from satisfactory because of poor sensitivity and the danger from the use of an open flame around an engine where inflammable fuels and fumes are present. Another approach which has been attempted, is the use of supersonic conductivity or high frequency electrical conductivity of the oil. While such conductivity will be a function of the amount of moisture, it will also be a function of the microscopically fine metal particles in the oil resulting from engine wear; and because of this, such procedure has not found wide acceptance by engine operators.

Summarizing the present invention, it is designed to overcome the aforementioned problem of determining an amount of water in oil above a predetermined quantity; particularly a dangerous amount of water in the lubricating oil of an internal combustion engine, such as locomotive diesel engines; and it has as its objects, among others, the provision of an improved simple test that can be conducted quickly and inexpensively by unskilled help, and while a diesel locomotive is en route.

Broadly, the invention comprises collecting a relatively small sample of the lubricating oil, diluting the same with a solvent for the oil, and incorporating in the resultant solution an oil-insoluble but water soluble dye which is capable of being solubilized in the presence of a relatively small percentage of the water to effect a marked color change in the diluted solution in the presence of such water, and ascertaining the color of the solution. The amount of oil and solvent are mixed in such a predetermined ratio that an adjusted solution is provided, so that when such adjusted solution contains a predetermined amount of water which is a measure or function of the predetermined amount of water in the oil (the dangerous amount of water in engine lubricating oil), the color change will be imparted to the solution by the dye. If no color change occurs in the solution, then the tester will know that the water in the oil is below the predetermined amount for which the oil is being tested. By making relatively frequent periodic tests on the oil in a locomotive diesel engine while enroute, one can then determine whether the water content of the oil has passed a safe level.

More particularly, dilution of the oil with the solvent is important because most lubricating oils, especially even after short use, are dark or colored, and the solvent renders the resultant oil solution relatively light so that a color change can be detected at the predetermined moisture content of the solution. Any suitable solvent can be employed for this purpose in which the dye or color agent is substantially insoluble, which has nonpolar characteristics so that it will not dissolve sufficient dye to interfere with determination of water content, and which is of the water-clear or light colored type so as to provide a relatively light solution when the lubricating oil is diluted therewith.

Desirable solvents of this type are the hydrocarbon solvents, such as the aromatic hydrocarbon solvents, benzene, toluene and xylene, or the aliphatic hydrocarbon solvents, hexane, kerosene, Stoddard solvent and cyclohexane. The aromatic hydrocarbon solvents are more desirable than the aliphatic hydrocarbons because they provide a faster response for solubilization of the dye by the moisture in the oil sample.

With respect to the dye or color agent, any suitable of the well known dyes can be employed which are substantially soluble in water, insoluble in oil and the solvent, and are capable of becoming solubilized in the presence of a relatively small percentage of water in the order of several hundredths of a percent, so as to impart a marked color change to the diluted oil solution when such diluted solution contains such relatively small percentage of water for which the test is adjusted to determine. Thus, for example, with respect to internal combustion engine lubricating oil, wherein it is recognized that about 0.45% to 0.5% moisture content is the precautionary safe limit to insure against damage to the engine by the water, and about 0.6% the maximum safe limit, the dye should be capable of becoming solubilized and thus impart a marked color change to the diluted solution at a much lower water concentration depending upon the extent of dilution of such solution which is determined beforehand.

In this connection, many types of dyes are available that have the above described properties but they will vary, respectively, in their rate of response in imparting color change to the solution of oil and solvent, and they will also become solubilized, respectively, at different moisture contents of the solution, and thus impart the marked color change at different moisture contents. However, knowing the moisture content at which any particular dye will become solubilized in the solution which can be readily determined beforehand by a chemist by making routine tests, he can then determine to what extent the oil has to be diluted by the solvent to provide an adjusted solution in which the color change will occur at a moisture content which will be a measure of the predetermined amount of water in the oil for which it is desired to test.

As a demonstrative example illustrative of the procedure, various solutions containing, respectively, the same quantity of oil and solvent but containing varying amounts of moisture can be tested quantitatively beforehand in the laboratory, such as by the aforementioned A.S.T.M. D95–46 method, to determine their respective moisture contents. Upon adding the same quantity of a dye "X" to each of such sample solutions, it is found that such dye becomes solubilized in the solution at about 0.03% by weight moisture content and dye "Y" at about 0.06% by weight moisture content, so that these dyes will impart marked color change to the solution at such respective percentages but not below the same.

Assuming that it is desired to determine whether the original oil contains in excess of 0.3% by weight of water, then in employing dye "X" for the test, each oil sample to be tested must always be diluted nine-fold with the solvent, whereby in the resultant solution dye "X" will always effect a marked color change at substantially 0.03% water. In using dye "Y," the original oil must always be diluted in the ratio of 4 parts solvent to 1 part oil. With respect to internal combustion engine lubricating oil wherein moisture content in excess of about 0.45% to 0.5% is the predetermined amount to be determined, then the original oil sample must always be diluted in the ratio of approximately 16 parts solvent to 1 part oil when employing dye "X" and in the ratio of approximately 7 parts solvent to 1 part oil when employing dye "Y," etc.

From the preceding, it is seen that the ratio of dilution of the oil sample is immaterial as long as it is always diluted with solvent to the same extent to provide a relatively small moisture content in the diluted solution so that the dye can become solubilized, depending upon the particular dye employed. Because of the small percentage of moisture in the oil which it is usually desired to test for, it is immaterial that the dilution is based on volume while the predetermined percent moisture in the oil to be tested is by weight.

As for rate of response of the dye, namely, the rapidity with which it will solubilize and impart the color change at the predetermined moisture content of the solution it will vary, depending upon the particular dye employed, some dyes acting faster than others. Fast dyes require shaking of the solution for about thirty seconds to one minute, while slow acting dyes require shaking of the solution up to as high as five minutes.

With respect to engine lubricating oils, so-called detergent additives are very commonly incorporated therein, such oils being known as heavy duty or medium duty oils. These additives, which may be present in quantities of up to about 5% by weight of the oil are of the sulfonate type; and their presence is highly desirable as they result in sharp and most accurate tests with the particular type of dye found most advantageous in such tests and which is discussed hereinafter. The reason for this is presently not understood.

As there are also non-additive lubricating oils which do not contain the aforementioned sulfonate additives, it is therefore desirable for insuring such sharp tests to have the sulfonate detergent present in the solvent system. Thus, with the sulfonate detergent present in the solvent system, it becomes immaterial whether the oil to be tested is known to be of the sulfonate detergent type. Any suitable sulfonate type detergent may be incorporated in the solvent system, such as "Petronate L" by Sonneborn and Sons, a sodium petroleum sulfonate; "Naccolene A" by National Aniline, an oil soluble sodium alkyl arylsulfonate; "Synfonate 28" by Bray Oil Company, a calcium petroleum sulfonate; "Oronite SA88" by Oronite Chemical Co., an alkyl aryl sulfonic acid; and Turkey Red Oil.

The amount of sulfonate added to the solvent is desirably in the range of from about 0.1% to 2.0% by weight of the solvent although such range is not particularly critical. With reference to the amount of sulfonate detergent additive which may be present in the oil, the above sulfonate range incorporated in the solvent will suffice for 0.0% up to about 5.0% by weight of such additive in the oil; the latter percentage being about the maximum amount of additive usually present in the oil.

The dye most advantageous for the test is of the cationic quaternary amine type having at least one sulfonate group within the dye. Such sulfonate group in the dye has been found desirable to insure that the dye will not become solubilized and impart color below the desired critical amount of water to be tested; particularly since the test described herein is a simple so-called "go or no go" test. In other words, if the solution to be tested has less than the critical amount of water, the dye will not impart its marked color change to the solution within a reasonable period after initiation of the test but will do so only substantially at or above such critical amount.

Suitable dyes are Neptune Blue Bra Conc., Guinea Green, Light Green and Patent Blue, all by General Dyestuffs Corporation; Acid Green L. Ex 200% and Alphazurine GLRD by National Aniline Co.; and Soluble Blue, Acid Violet and Pontacyl Violet by du Pont. These quaternary amine type dyes having at least one sulfonate group may be expressed by the general formula:

where R is any well known rather complex quaternary amine type dye base, $n$ represents 1 or more sulfonate groups, and X is a cation. The dye found most desirable is the aforementioned Neptune Blue Bra Conc. having the empirical formula $C_{37}H_{42}N_4O_9S_3$, and the following general structural formula:

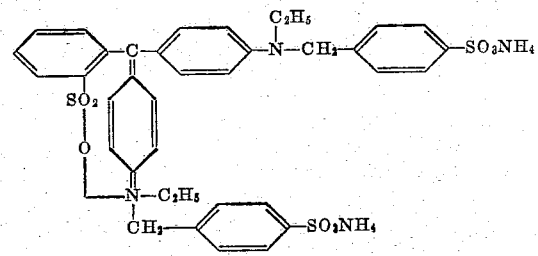

As previously mentioned, the oil sample to be tested may be diluted with the solvent in relatively wide proportions, but this is not critical, as it is only necessary to have a relatively small water concentration in the diluted oil-solvent solution which will reveal a marked color change at the critical water content for which it is desired to test. However, the water content of the oil-solvent solution to be tested should not be too great because with relatively high precentages of water in the solution, the dye will dissolve so promptly in the water, that the color change will not occur at the moisture content for which it is desired to test. Water in the solution may be present at as low as 0.01% by weight but should not exceed 0.3% for best results.

With respect to lubricating oil of an internal combustion engine wherein 0.45% to 0.6% by weight water is the danger point, a suitable dilution of the oil sample by the solvent is four to fifty-fold depending on the dye. With the preferred dye, namely, Neptune Blue Bra Conc., a readily observable greenish or bluish color change will occur at a relatively small percentage of about 0.03% moisture in the diluted solution. Hence, when testing for above 0.45% to 0.5% water in the lubricating sample, the oil sample should be diluted with about 14 parts of solvent.

As for the amount of dye to be incorporated in the diluted test sample, this is also not particularly critical as it is only necessary to have sufficient dye present to effect the color change. Relatively large excesses of dye are relatively immaterial, although at the moisture content point of the solution it is desired to determine, the quantity of the dye does within certain limits effect the color change below such point with increasing amounts of dye but not proportionately. Hence, it is desirable to employ substantially the same quantity of any given dye for each test. Thus, depending upon the particular dye employed, as little as 0.02% of the dye by weight of the oil-solvent solution will suffice with slightly increased sensitivity as the amount of dye is increased in the lower ranges thereof, and as much as 1.0% by weight may be employed. Usually, where the amount of solvent-oil solution varies from 1 part of oil to 4 to 50 parts of solvent, with moisture content of from 0.01% to 0.3% by weight, the amount of dye may vary from 0.05% by weight to 1.0%. However, it is only necessary to have sufficient dye present to become solubilized.

The dyes of the desirable type mentioned are all powders, and to insure that for the testing of any given type of oil, substantially the same amount of dye is used for each test, one may make pellets thereof each containing the same amount of dye in order to avoid measuring the dye each time. This can be readily done by uniformly mixing a given quantity of dye with a carrier, such as wax in the molten state, and then after the wax has solidified, cutting the mass into small pellets of uniform volume, each of which will contain substantially the same predetermined amount of dye. Another way of making the dye pellets of uniform dye quantity is to grind a given quantity of dye with a given quantity of crystalline naphthalene, and milling the resultant mix into pills of appropriate weight. Instead of making pellets, one may uniformly suspend or disperse a given quantity of the dye in a given batch volume of the solvent for the oil to be tested; and while maintaining the suspension uniform with gentle stirring, fixed aliquot portions of the same quantity can be removed from the batch. Each of such aliquot portions will thus contain the same amount of dye.

With respect to the testing of lubricating oil of a locomotive diesel engine, a dilution of 1 volume of oil to 14 volumes of solvent has been found desirable, as the resultant solution can be held in a conventional 4 dram transparent vial in the form of a glass container, which holds about 15 cubic centimeters. In such diluted solution, 28 mgs. of the preferred dye will effect a marked color change at a water content of about 0.033% which is comparable to 0.50% water in the original oil sample.

The drawings illustrate forms of apparatus kits with which the method of this invention can be conducted. In such drawings:

FIG. 1 is an exploded view of a combined view and vial containing cabinet;

FIG. 2 is a fragmentary section taken in plane indicated by line 2—2 in FIG. 1;

FIG. 3 is an elevational view of a glass vial;

FIG. 4 is an isometric view of another form of viewer and vial containing cabinet, on a reduced scale compared to FIGS. 1 through 3.

For conducting the test, it is only necessary in the testing of each original oil sample, that the same quantity of oil be diluted with the same quantity of solvent so as to provide an adjusted solution which will give a correct indication of color change each time the test is made. For accomplishing this result with minimum time and work beforehand, it is advantageous to employ always containers of light transmitting material, such as glass vials, all of which are of the same predetermined fixed volume and shape.

For example, the conventional 4 dram glass vial 1, illustrated in FIG. 3, is very convenient. A plurality of such vials is each filled with the same quantity (14 cc.) of solvent to prepare them for the tests. This will leave free head space 2 of about 1 cc. below the top of each vial, and between level 3 of solvent and shoulder 4. When the oil sample is taken, it is poured into the vial, up to the level of shoulder 4 which thus serves as a reference point, to thus provide an oil-solvent solution of 14 parts of solvent by volume to 1 part of oil by volume. If desired, any suitable marking may be placed on the vial to indicate the reference point for addition of 1 cc. of the oil sample.

Desirably, the same predetermined small amount of dye is incorporated in the solvent in the respective vials, and the vials are each capped with screw stopper 5 which has the usual sealing tin foil liner 5' under its cap and is tightly sealed, so as to prevent entrance of outside moisture into the vial. The vials prepared beforehand with the dye in the solvent, thus serve as useful articles for those who desire to obtain them for conducting the tests. When the test is to be made, a vial thus prepared is employed and the final amount of oil is added. The vial is shaken usually for about one to two minutes and if there is no color change effected by the dye, then one knows that the water content of the original oil is not above the predetermined amount being tested. A succeeding test can be made at a suitable later interval in the same way; and when a test shows a color change, then the tester knows the water content of the oil exceeds the predetermined safe limit.

Insofar as efficacy of the test is concerned, the dye need not be introduced into the vial beforehand with the solvent but can be added at the time of the test. However, having the dye with the solvent, renders the testing much simpler.

FIGS. 1 and 2 illustrate a convenient kit assembly which can be employed for making the respective tests. A cabinet 6 of opaque material, such as wood, is provided with a slidable drawer 7 having a plurality of pockets 8 for the glass vials 1 each of which contains the same predetermined quantity of solvent filled to level 3, in which is incorporated substantially the same amount of dye; the vials being closed with their screw stoppers 5.

Cabinet 6 contains a source of electrical energy in the form of flashlight batteries 9 to energize electric light bulbs 11 by means of push bottom switch 12. One wall of the cabinet is provided with a pair of sight holes 13 and with associated pockets 14 open at the top into which vials 1 may be positioned.

When it is desired to conduct a test, cabinet drawer 7 need only be opened, a vial removed, the oil to be tested poured into the vial to the level of shoulder 4 so as to provide the relatively fixed quantity of oil each time, and after shaking for a short time, the color of the solution can be viewed through the transmitted light from an energized bulb 11 when the vial is positioned in one of pockets 14. If desired, the other pocket can be utilized to place in position a control vial having the color at which the water content is dangerous to the engine but this is not necessary.

It is best to conduct the test by holding the sample vial in front of a light although this is not necessary at all times, as a marked color change of the solution when the content of water in the oil is dangerous in accordance with the adjustment of the solution, can be readily detected in daylight provided the oil sample added to the vial is not too dark. However, it is best to view the sample through a transmitted artificial light, and for this purpose a flashlight or other light source can be employed. It is best for accuracy to use the light observing color test. However, this is not essential because in many instances if the color cannot be readily detected in daylight, a small amount of the solution can be poured on a piece of absorbent paper and the color stains appearing on the paper can be observed.

FIG. 4 illustrates a simple modified form of viewer in which test vials can be stored, and in which a vial containing oil to be tested can be viewed by means of a flashlight. Such viewer comprises a block 21 of opaque material, such as wood, having a plurality of pockets 22 adapted to store a plurality of vials previously prepared in the manner described. Each side wall of the block is provided with a sight opening 23 communicating therewith; the sight openings being alined. Hence, by holding a lighted flashlight over one opening 23, the test can be observed through the other opening.

The following is a typical example of the preferred test composition and method of this invention for the detection of an injurious amount of water in lubricating oil of an internal combustion engine, irrespective of whether it is known that the oil does or does not contain a sulfonate detergent additive.

EXAMPLE 1

*Preparation of test composition and vials*

A 10.0% weight by volume (w./v.) solution of the aforementioned "Synfonate 28"—calcium petroleum sulfonate (40 gms.) in xylene (360 ml.) was prepared and the solution heated to boiling. Boiling was continued until about 10% of the solvent had distilled off, thus effectively carrying off any traces of water that may have been present in the calcium petroleum sulfonate. The solution was cooled and the lost solvent replaced with additional dry xylene. The above procedure is merely for the purpose of insuring that the stock solvent-sulfonate solution is free of any small amount of water which may sometimes be present in the sulfonate. If the sulfonate is known to be dry, then such procedure may be omitted.

Twenty-five ml. of the above stock solvent-solution was added to 475 ml. of dry xylene in a 600 ml. beaker, to prepare an 0.5% solution of the sulfonate. The beaker was equipped with a magnetic stirring bar and the solution was stirred. While thus stirred, a 1.0 gm. sample of the aforementioned Neptune Blue Bra conc. was weighed and added to make a 0.2% suspension of the dye in the solution. The dye dispersed rapidly and only gentle stirring was needed to keep the suspension uniform.

By means of a hypodermic syringe and needle, 14 ml. portions of the suspension were measured and transferred to the previously described 4-dram screw-cap vials which have a volume of 15 ml. up to the upper, inner shoulder 4 of the vial. The filled vials were then closed tightly with conventional tin foil lined screw caps for storage until needed. They may be thus stored for a relatively long period as long as moisture does not enter the same.

*Testing procedure*

Samples of engine lubricating oil were removed from the crankcase of engines by means of a syringe, and added to each of a plurality of vials up to the shoulder 4 of the vial, thus resulting in an addition of approximately 1 ml. The vials were capped tightly, and each vial was shaken vertically for about one minute, allowed to stand for two more minutes, and shaken for about ten seconds. The color was then observed in the viewer of FIG. 5 by means of a flashlight, and the following results were observed on three known oils in which the water content was determined beforehand:

| Test Oil | Water Content of Oil, percent | Water Content of Test Solution, percent | Marked Greenish or Bluish Color Change |
|---|---|---|---|
| (A) Old, highly acidic non-additive | 0.0 | 0.0 | No. |
|  | 0.25 | 0.017 | No. |
|  | 0.50 | 0.033 | Yes. |
|  | 1.00 | 0.067 | Yes. |
| (B) Little used Medium Duty 2.0% sulfonate additive containing | 0.0 | 0.0 | No. |
|  | 0.25 | 0.017 | No. |
|  | 0.50 | 0.033 | Yes. |
|  | 1.00 | 0.067 | Yes. |
| (C) New, very basic Heavy Duty 4.0% sulfonate additive containing | 0.0 | 0.0 | No. |
|  | 0.25 | 0.017 | No. |
|  | 0.50 | 0.033 | Yes. |
|  | 1.00 | 0.067 | Yes. |

In the above tests, the oil may be added to the vials by means of allowing the same to drip from the engine dip stick up to the predetermined reference points in the vials. The use of the viewer and incandescent light source may be omitted by allowing the dye which is suspended in the test solutions to settle before observing the color formation but this adds to the overall length of time needed for the test. The precise shaking procedure for the test vials is not critical but is recommended to insure that the dye has had sufficient time to become solubilized at the critical amount of moisture to be tested.

In the above test, if the oil being tested is highly colored such as may occur from long usage, or should the oil contain very large amounts of water over 1 percent, the test vial may not seem colorless at the end of the prescribed three minute period, but neither will it appear greenish or bluish as will be the case where the test oil is relatively light in color and contains a moderate concentration of water. Instead of such bluish or greenish color, the color may appear red, brown, yellow, amber or orange. This is because the dark color of the oil obscures the greenish or bluish color which will appear at the critical percentage of water noted above.

Under such circumstances, after following the above procedure, and if any color such as the red, brown, yellow, amber or orange appears, the test may be made by waiting for two minutes, and again shaking the vial for ten seconds. The test vial should then be held upside down and at a slight slant; and while shaking the vial gently with the hand while holding it, the greenish or bluish color which is effected at about the 0.5% moisture content in the oil can be observed by directing a lighted flashlight against the splashing liquid. The surface of such splashing liquid while the vial is held at a slant and gently shaken will reveal the color if the oil contains above the critical amount of moisture being tested.

As previously indicated, if it is known that the oil to be tested is of the sulfonate additive containing type, then the sulfonate need not be added to the solvent. However, as previously explained, since it may not be known whether the oil is an additive or non-additive oil, the preferred procedure is also to include the sulfonate in the solvent. The following Example II is illustrative of a test in which the solvent does not contain a detergent sulfonate because it is known that the oil contains the sulfonate additive. Also, in such example, the dye is added to the solvent in the form of pellets.

EXAMPLE II

*Preparation of test composition and vials*

One-half gram of Acid Green L-Ex 200% (a sulfonated-quaternary dye by National Aniline Co.) was uniformly suspended by stirring in 5 grams of barely molten paraffin which was then poured into a flat-bottomed, 50 mm. diameter, aluminum dish. The paraffin was allowed to cool, whereupon pellets in the form of discs were cut with a 6 mm. diameter tubular cutter. These discs weighed about 50 mgs. each, and each contained about 5 mg. of the dye. A plurality of test vials was prepared by adding 1 disc to each 4-dram (15 cc.) screw-capped, glass vial, followed by enough xylene (14 cc.) to allow 1 cc. of void head space between the top level 3 of the solvent and the shoulder 4 of the vial.

The dye has the following empirical formula

and the following general structural formula:

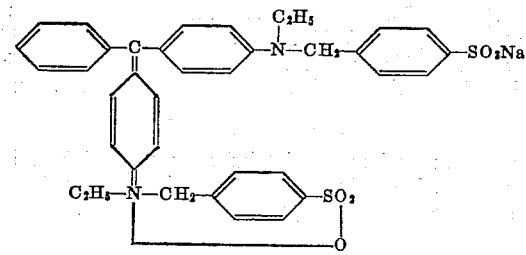

*Testing procedure*

A sample of 1 cc. of a known lubricating oil containing 2.0% by weight sulfonate additive (enough to fill the tube to the shoulder) was added to each vial, the vial stoppered, and shaken for 1 minute, allowed to stand for 2 minutes, and then shaken for 10 seconds, as in Example I. The color was then examined by holding the vial between the viewer and a Mazda lamp. (Household lamp or flashlight.) On a series of such oil each containing a known amount of water, the following results were obtained:

| Water content of oil, percent | Water content of Solution, percent | Color | Interpretation |
|---|---|---|---|
| 0.05 | 0.033 | Reddish Amber | Safe amount of water. |
| 0.3 | 0.02 | Amber | Do. |
| 0.45 | 0.03 | Faint Green | Dangerous amount of water. |
| 0.6 | 0.04 | Green | Do. |
| 0.8 | 0.053 | ---do--- | Do. |
| 1.1 | 0.073 | ---do--- | Do. |

It will be noted that a faint green color was observed with 0.03% moisture content in the solution corresponding to 0.45% moisture in the oil; which indicates that the danger point had been approached. At 0.6% moisture content in the oil corresponding to 0.04% moisture in the sample, the color was deeper green. Of course, if the first sample of oil from an engine is tested and a green color appears, there is no quantitative determination of the water actually present but the tester will know that the water in the engine oil has reached a dangerous quantity and therefore the oil has to be changed.

When 10 mgs. of the same dye employed in the above example are used instead of 5 mgs., a green color was formed with the oil sample containing 0.3% water, corresponding to 0.02% water in the solution. As this quantity of dye produces a color change or break at a percentage of water in the solution (14 parts solvent and 1 part oil) which is below an amount of moisture (0.03%) in such dilution which is a measure of the dangerous amount of water in the oil, for tests with 10 mgs. of dye, the dilution of solvent to oil should be adjusted to about 23 parts of solvent to 1 part of oil, so that the color break is obtained at 0.02% of water content in the 23 to 1 solution corresponding to about 0.45% to 0.5% water content in the oil.

By making continual routine tests, for example, on a diesel locomotive as it is en route, and doing so at regular periodic intervals, one can always tell as soon as the water content in the oil has reached a dangerous state. The above examples provide a convenient adjusted solution of 14 parts solvent by volume to 1 part of oil which gives the marked color change at the percentage of water in the solution indicated. However, for other particular dyes and other dilutions, one can beforehand readily tell what adjusted solution is required, to give the marked color change imparted by the dye at a relatively small water content of the solution which is a measure of the danger point of water in the oil.

I claim:

1. Means enabling testing of oil samples to determine whether the respective samples contain water above a predetermined quantity, comprising a plurality of containers of light transmitting material, solvent for said oil in each container, the same quantity of solvent being in each container to a level below the top of each container thereby providing free head space above said level, a sulfonate detergent dissolved in said solvent in each container, the same quantities of dye being in the respective containers with the solvent, said dye being a quaternary amine dye having at least on sulfonate group and being substantially insoluble in the solvent and oil but soluble in water and being capable of being solubilized in the presence of a relatively small quantity of water, and each container having a predetermined reference point above said solvent level whereby when oil samples are introduced into the respective containers to such reference points the respective containers will contain substantially the same quantity of oil samples.

2. As an article of manufacture, means enabling testing of an oil sample to determine whether such sample contains water above a predetermined quantity, comprising a vial of light transmitting material having therein a predetermined quantity of a solvent for said oil occupying the vial to a predetermined level, a sulfonate detegent dissolved in said solvent, a substantially water soluble but oil and solvent insoluble quaternary amine dye having at least one sulfonate group in said solvent, said solvent level being below the top of the vial thereby providing free head space above said level, said vial having a reference point above said level whereby said vial will contain a predetermined quantity or oil when it is introduced therein to said reference point, and a removable stopper closing the mouth of said vial.

3. A composition for testing oil to determine whether such oil contains water above a predetermined quantity consisting essentially of a non-polar solvent for the oil, a sulfonate detergent dissolved in said solvent, and a substantially water soluble but oil and solvent insoluble quaternary amine dye having at least one sulfonate group in said solvent.

4. The method of periodically testing lubricating oil of an internal combustion engine for determining whether such oil contains water above a predetermined quantity that would be injurious to further operation of said engine which comprises providing a plurality of vials of light transmitting material which are all of substantially the same fixed volume and shape; each vial having therein substantially the same quantity of a substantially non-polar solvent for said oil to a level below the top of the vial thereby providing substantially the same amount of head space above said level, and each vial having a predetermined reference point above said solvent level whereby when oil samples are introduced into the respective vials to such reference points the respective vials will contain substantially the same quantity of oil sample; the solvent in the respective vials having dissolved therein a sulfonate detergent and containing a substantially water soluble but oil and solvent insoluble quaternary amine dye having at least one sulfonate group; periodically employing a vial and adding said engine oil thereto to said reference point thereof; and determining the color of the resultant oil-solvent solution thus tested.

5. Means enabling periodic testing of engine lubricating oil samples to determine whether the respective oil samples contain water above a predetermined quantity that would be injurious to further operation of said engine, comprising a plurality of vials of light transmitting material all of substantially the same fixed volume and shape; each vial having a test composition therein consisting essentially of a non-polar solvent for the oil to be tested, a sulfonate detergent dissolved in said solvent, and a substantially water soluble but oil and solvent insoluble quaternary amine dye in said solvent and having at least one sulfonate group, said dye being capable of being solubilized in the presence of a predetermined relatively small quantity of water present in the composition when an oil sample containing such injurious quantity of water is added to such composition and diluted by the solvent; each vial having substantially the same quantity of solvent therein providing substantially the same solvent level below the top of the vial thereby providing the same amount of head space above said level; and each vial also having a predetermined reference point at substantially the same location above such solvent level whereby when oil samples are introduced into the respective vials to such reference points the respective vials will contain substantially the same quantity of oil sample.

References Cited in the file of this patent

UNITED STATES PATENTS

| | | |
|---|---|---|
| 1,259,669 | Reiche | Mar. 19, 1918 |
| 1,659,529 | Hyuga | Feb. 14, 1928 |
| 1,775,134 | Malsbury | Sept. 9, 1930 |
| 1,986,403 | Lehmkuhl | Jan. 1, 1935 |
| 2,515,232 | Kantrowitz et al. | July 18, 1950 |
| 2,761,312 | Line et al. | Sept. 4, 1956 |

OTHER REFERENCES

Nesh: "Determination of Minute Traces of Water by Use of Methylene Blue," Analytical Chemistry, vol. 27, No. 11, November 1955, pages 1842 and 1843.